(12) United States Patent
Chueh

(10) Patent No.: US 6,398,244 B1
(45) Date of Patent: Jun. 4, 2002

(54) PROPELLING SCOOTER

(75) Inventor: Hung-Che Chueh, Taichung (TW)

(73) Assignee: Vigorousport Int., Co., Ltd., Taichung (TW)

( * ) Notice: Subject to any disclaimer, the term of this patent is extended or adjusted under 35 U.S.C. 154(b) by 0 days.

(21) Appl. No.: 09/808,905

(22) Filed: Mar. 15, 2001

Related U.S. Application Data

(63) Continuation-in-part of application No. 09/670,649, filed on Sep. 27, 2000.

(30) Foreign Application Priority Data

Jan. 19, 2001 (TW) .................................. 90201202 U

(51) Int. Cl.[7] .............................................. B62M 1/00
(52) U.S. Cl. ...................... 280/221; 280/253; 280/258; 74/594.1; 74/594.2; 74/606 R
(58) Field of Search ................................ 280/220, 221, 280/252, 253, 255, 258, 263; 74/561, 125, 594.1, 594.2, 606 R

(56) References Cited

U.S. PATENT DOCUMENTS

| | | | | |
|---|---|---|---|---|
| 4,186,934 A | * | 2/1980 | Collings | 280/221 |
| 4,463,963 A | * | 8/1984 | Martin | 280/253 |
| 4,779,863 A | * | 10/1988 | Yang | 272/114 |
| 4,846,488 A | * | 7/1989 | Szadkowski | 280/221 |
| 4,861,054 A | * | 8/1989 | Spital | 280/221 |
| 4,915,403 A | * | 4/1990 | Wild et al. | 280/221 |
| 5,536,029 A | * | 7/1996 | Gramckow | 280/263 |
| 5,895,065 A | * | 4/1999 | Khomo | 280/221 |
| 6,241,269 B1 | * | 6/2001 | Fan | 280/265 |

* cited by examiner

Primary Examiner—Brian L. Johnson
Assistant Examiner—Daniel Yeagley
(74) Attorney, Agent, or Firm—Akin, Gump, Strauss, Hauer & Feld, L.L.P.

(57) ABSTRACT

A propelling scooter includes a chassis, an upright head tube with a handle, a front wheel, and a rear wheel. An elongated pedal is disposed swingably on the chassis. A horizontal transverse first shaft is journalled on the chassis, and is connected fixedly to the pedal, thereby permitting rotation of the pedal about the first shaft. When the pedal is swung, a transmission gearing unit transfers rotation of the first shaft to a driving wheel, which in turn rotates the rear wheel via a flexible endless drive piece. As such, reciprocal rotation of the first shaft is converted into continuous unidirectional rotation of the rear wheel.

5 Claims, 6 Drawing Sheets

PROPELLING SCOOTER

CROSS-REFERENCE TO RELATED APPLICATION

This is a Continuation-in-Part (CIP) of U.S. patent application Ser. No. 09/670,649, filed on Sep. 27, 2000.

BACKGROUND OF THE INVENTION

1. Field of the Related Art

This invention relates to a scooter, more particularly to a scooter, which can be propelled to move forward continuously.

2. Description of the Related Art

A scooter is a vehicle for a user, especially a child, to stand on with one foot and to propel the same using the other foot for thrusting against the ground. Referring to FIG. 1, a conventional scooter is shown to include a chassis 1, a head tube 2, a front wheel 3, and a rear wheel 4. The head tube 2 has an upper end that is provided with a handle with two grip portions 201.

Although this conventional scooter is popular, it 20 still has the following disadvantages:

1. Intermittent propelling:

Because it is pushed forward only at each time one foot touches the ground, the conventional scooter is propelled intermittently, and moves forward at a relatively low speed.

2. Insufficient safety:

Because the user must lower one foot to touch the ground, and lift it away from the ground time after time, it is difficult for the user to keep balance on the scooter, especially for a young child.

SUMMARY OF THE INVENTION

An object of this invention is to provide a scooter, which can be propelled to move forward continuously as desired.

Another object of this invention is to provide a highly safe propelling scooter.

According to this invention, a propelling scooter includes a chassis, an upright head tube with a handle, a front wheel, and a rear wheel. An elongated pedal is disposed swingably on the chassis. A horizontal transverse first shaft is journalled on the chassis, and is connected fixedly to the pedal, thereby permitting rotation of the pedal about the first shaft. When the pedal is swung, a transmission gearing unit transfers rotation of the first shaft to a driving wheel, which in turn rotates the rear wheel via a flexible endless drive piece. As such, reciprocal rotation of the first shaft is converted into continuous unidirectional rotation of the rear wheel.

BRIEF DESCRIPTION OF THE DRAWINGS

These and other features and advantages of this 25 invention will become apparent in the following detailed description of a preferred embodiment of this invention, with reference to the accompanying drawings, in which.

DETAILED DESCRIPTION OF THE PREFERRED EMBODIMENT

Figure 1:
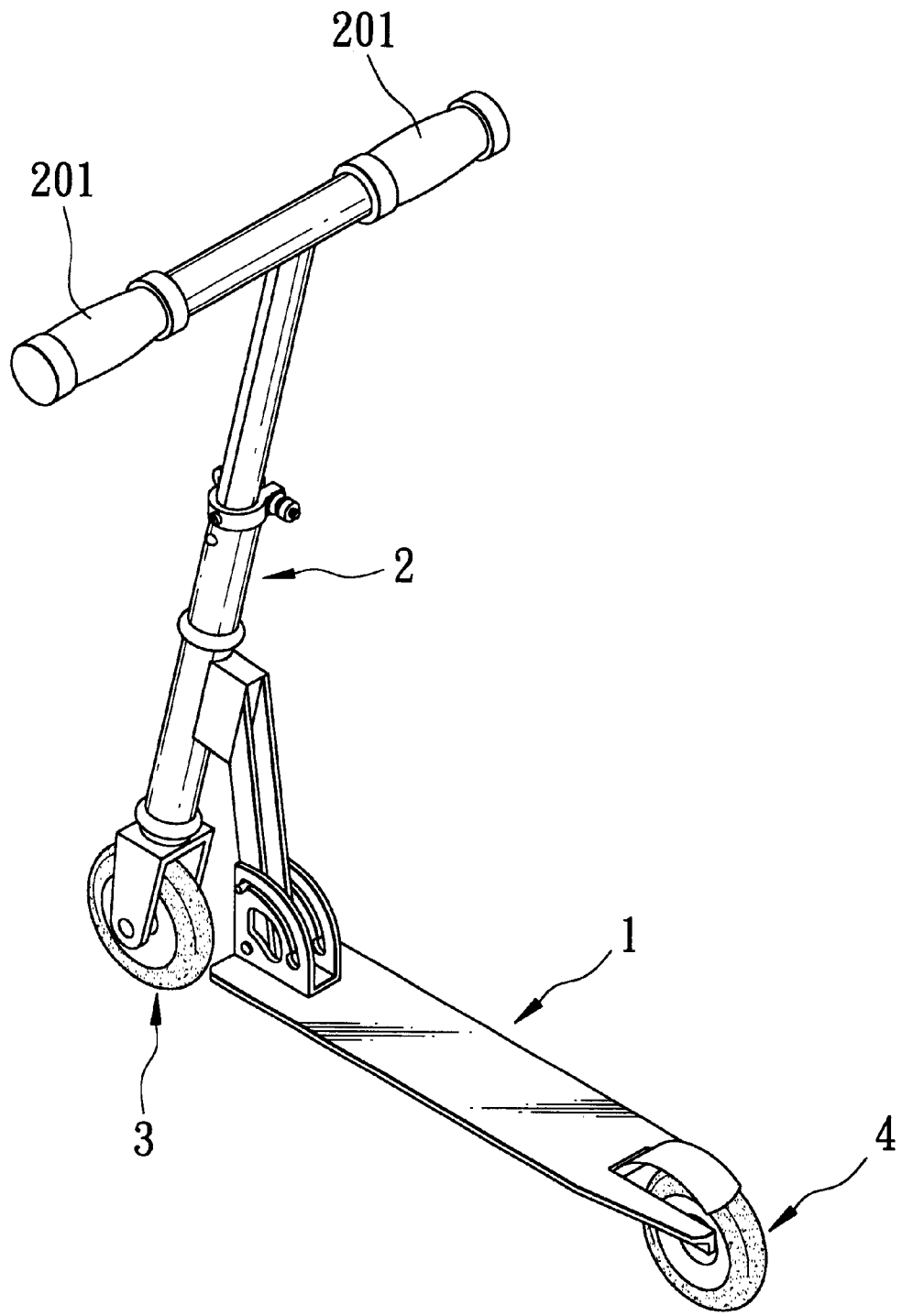
FIG. 1 is a perspective view of a conventional scooter.
Figure 2:
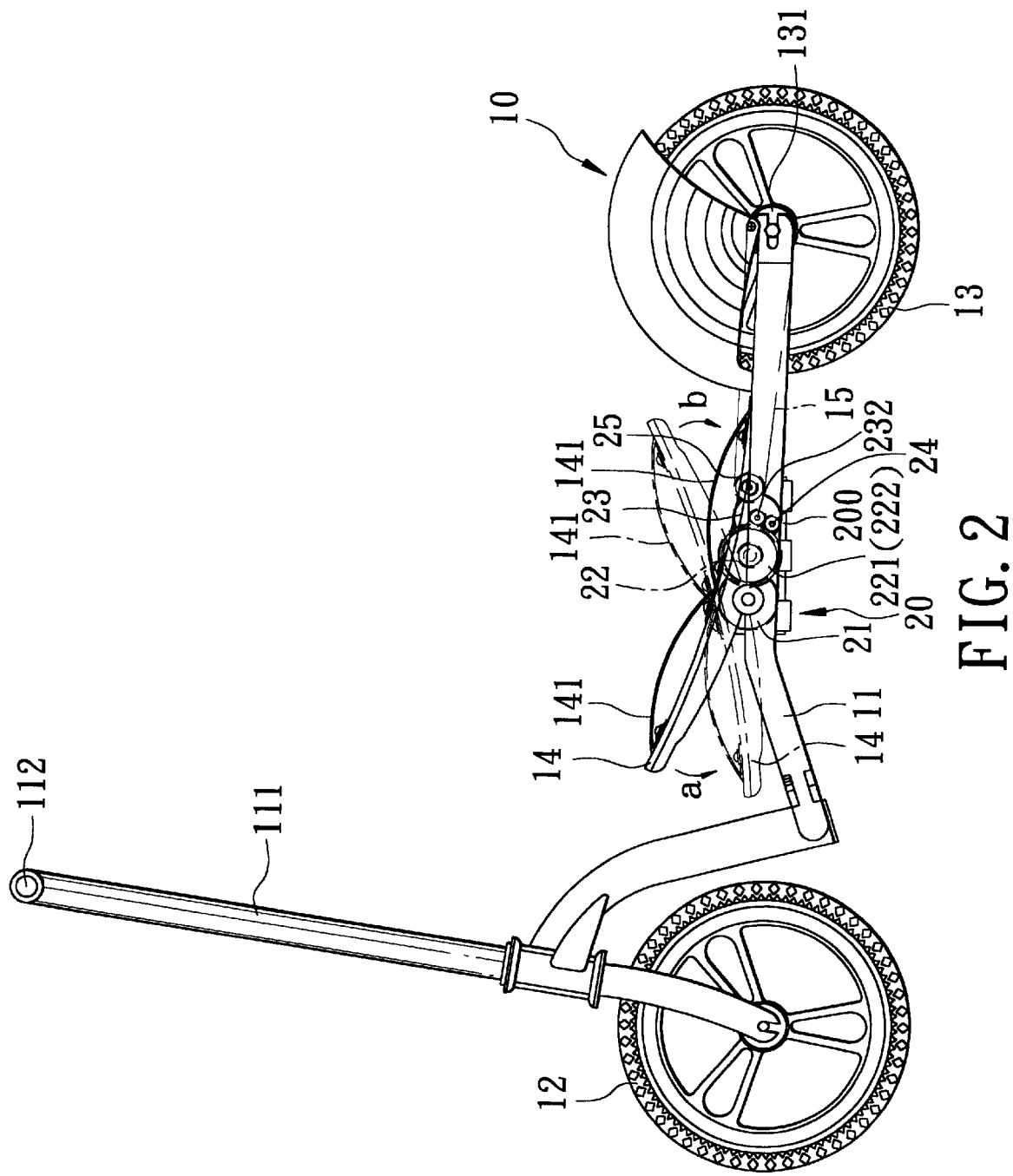
FIG. 2 is a schematic side view of the preferred embodiment of a propelling scooter according to this invention.
Figure 3:
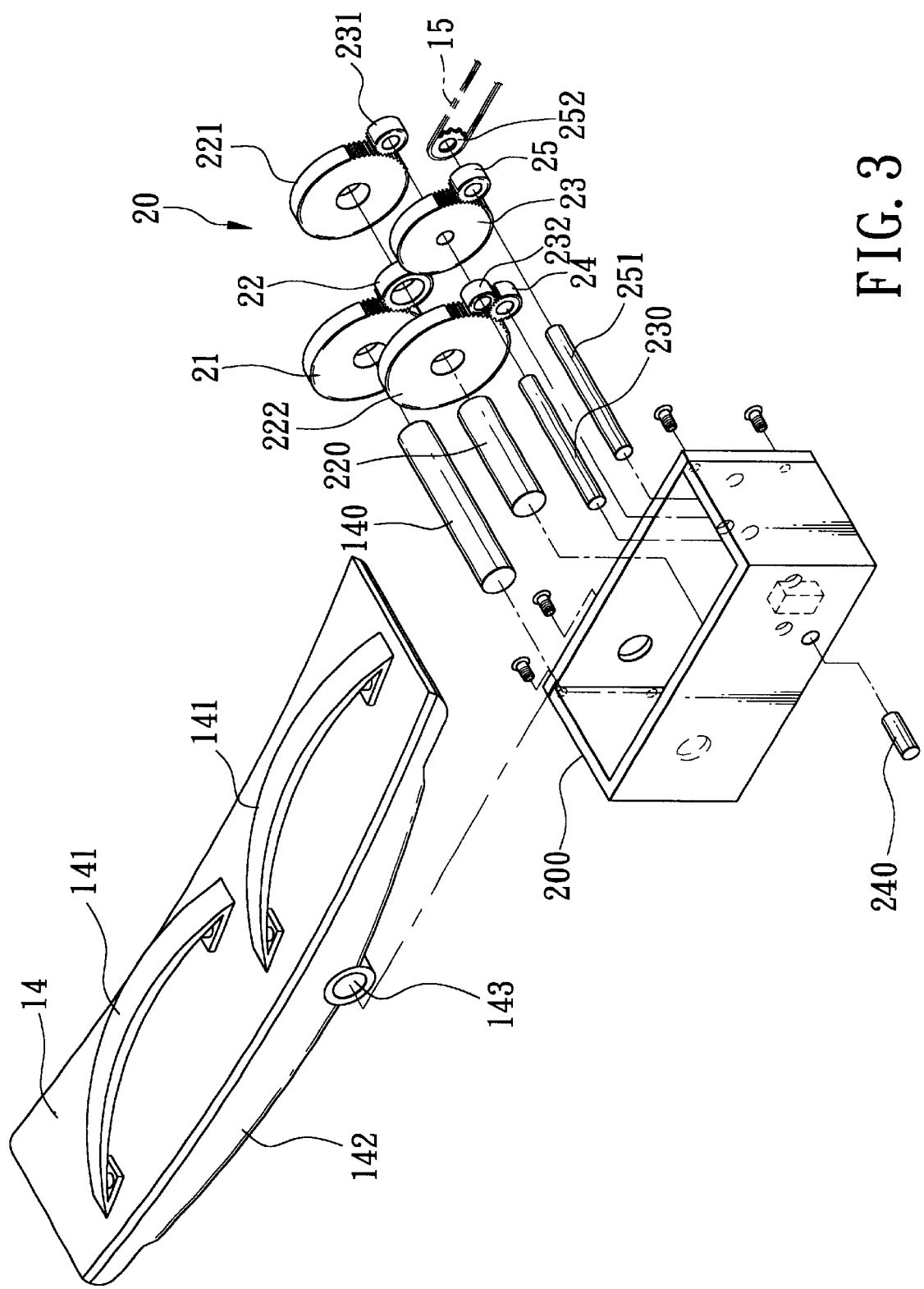
FIG. 3 is an exploded view of a pedal and a driving device of the preferred embodiment.
Figure 4:
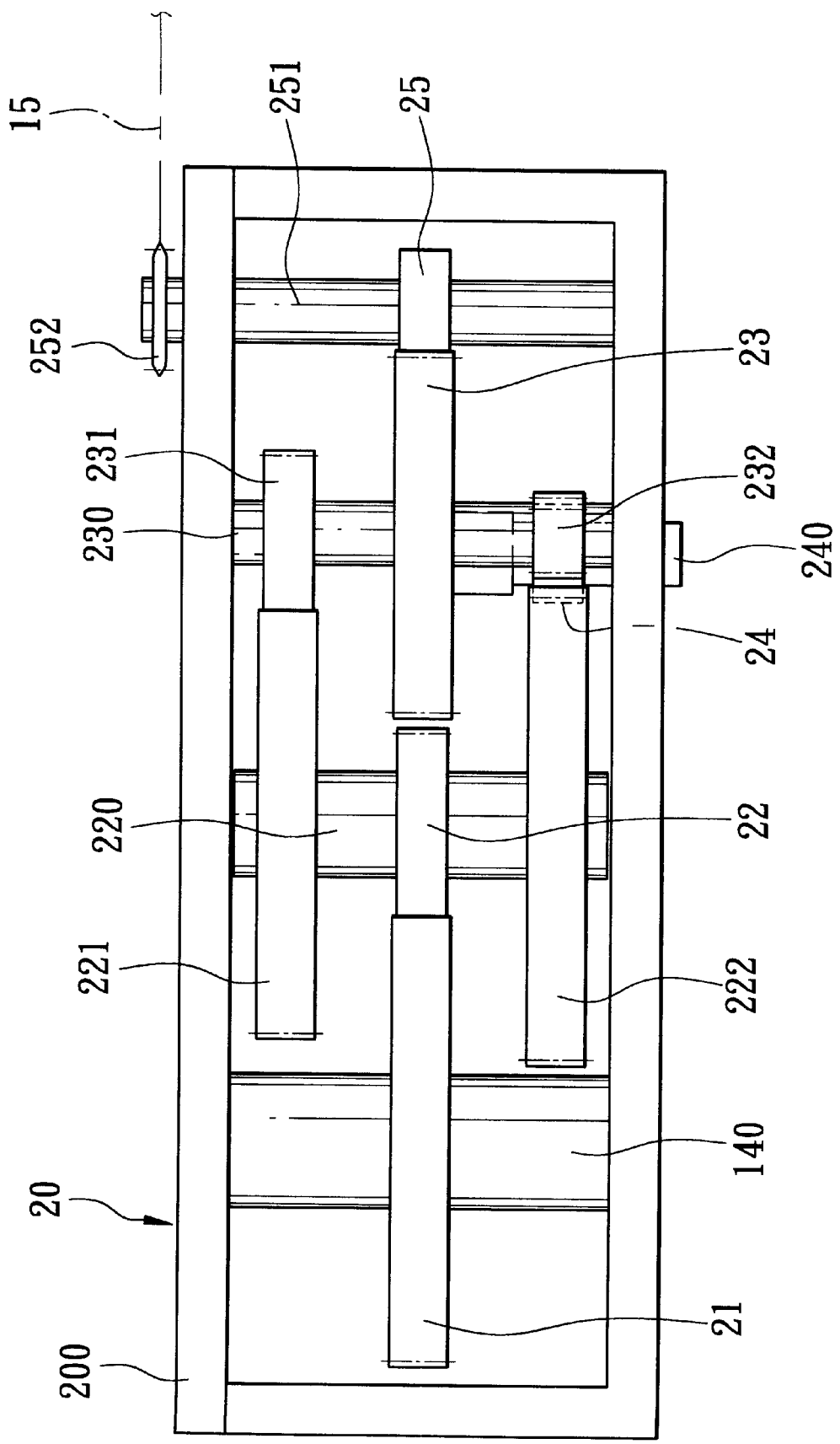
FIG. 4 is a schematic top view of the driving device of the preferred embodiment.

Referring to FIGS. 2, 3, and 4, the preferred embodiment of a propelling scooter 10 according to this invention is shown to include an elongated chassis 11, a front wheel 12, a rear wheel 13, an elongated pedal 14, 20 and a flexible endless drive piece 15.

An upright head tube 111 has a lower end portion that is attached to the front end of the chassis 11, and an upper end portion that is formed with a handle 112. The front wheel 12 is attached steerably to a front end of the chassis 11, while the rear wheel 13 is attached rotatably to a rear end of the chassis 11. The pedal 14 is disposed swingably on the chassis 11 between the front and rear wheels 12, 13, and includes two curved and inclined parallel retaining straps 141, which are disposed respectively on front and rear half portions of the top surface thereof. Each of the straps 141 has two ends that are fastened to the top surface so as to define a foot-receiving space between the top surface and each of the straps 141, which is adapted to confine a foot of the user therewithin.

A horizontal transverse first shaft 140 is journalled 10 on the chassis 11, and is connected fixedly to the pedal thereby permitting rotation of the pedal about the first shaft 140. A driven wheel 131 is connected coaxially and fixedly to the rear wheel 13. A flexible endless drive piece 15 extends around the driven wheel 131 and a driving wheel 252 of a driving device 20 for transferring rotation of the driving wheel 252 to the rear wheel 13. In this embodiment, the drive piece 15 is a chain, while the driving and driven wheels 252, 131 are sprockets. The chain 15 and the sprockets 252, 131 can be replaced with an endless belt and a pair of belt pulleys.

The driving device 20 includes a rectangular casing 200, which is bolted to the chassis 11 and which receives a transmission gearing unit therein.

A driving gear 21 is sleeved fixedly on the first shaft 140 so as to rotate reciprocally about the first shaft 140 when the pedal 14 swings relative to the chassis 11.

The driving wheel 252 is mounted rotatably on the chassis 11 between the first shaft 140 and the rear wheel 13. A driven gear 25 is connected coaxially and fixedly to the driving wheel 252.

The driving and driven gears 21, 25 are interconnected by means of the transmission gearing unit so as to convert reciprocal rotation of the first shaft 140 into continuous unidirectional rotation of the driving wheel 252. The transmission gearing unit includes a second shaft 220, a driven middle gear 22, a pair of first and second driving side gears 221, 222, a first one-way mechanism 2211 (see FIG. 5), a second one-way mechanism 2221 (see FIG. 5), a third shaft 230, a driving middle gear 23, a first driven side gear 231, a second driven side gear 232, a fourth shaft 240, a third driven side gear 24, and a fifth shaft 251.

The shafts 140, 220, 230, 240, and 251 are journalled within the casing 200. The pedal 14 is formed with two downwardly extending integral wings 142, between which the casing 200 is disposed. Each of the wings 142 has a hole 143, through which the first shaft 140 extends.

The second shaft 220 is disposed between the first and third shafts 140, 230. The fourth shaft 240 is disposed under the third shaft 230 and in front of the fifth shaft 251.

The driven middle gear 22 is sleeved fixedly on a middle portion of the second shaft 220, and meshes with the driving gear 21 so that the first and second shafts 140, 220 rotate in opposite directions. The first and second driving side gears 221, 222 are sleeved respectively and rotatably on two ends of the second shaft 220.

Figure 5:
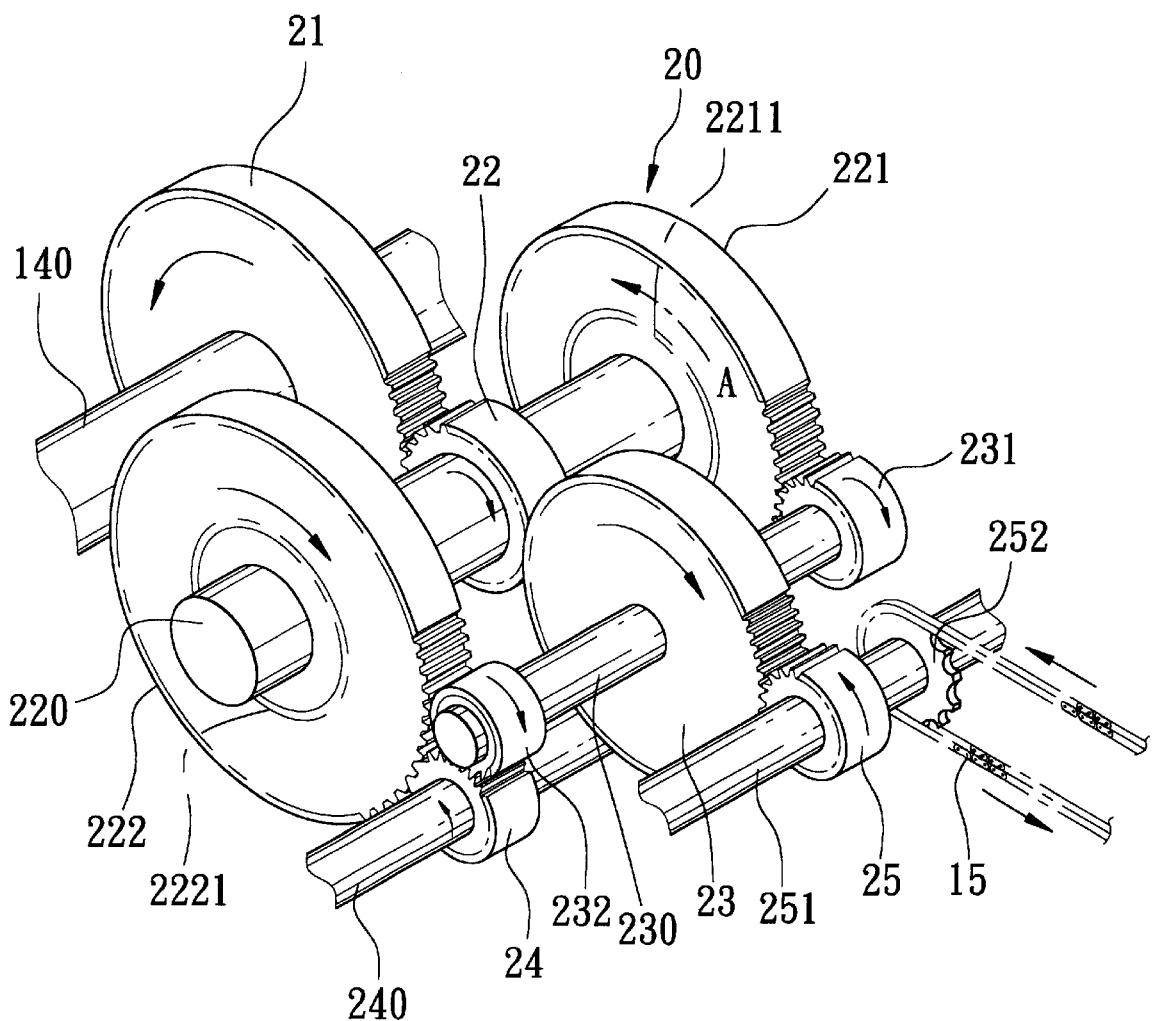
FIG. 5 is a schematic view, illustrating the rotational directions of gears and shafts of the driving device when a front end of a pedal is pressed.
Figure 6:
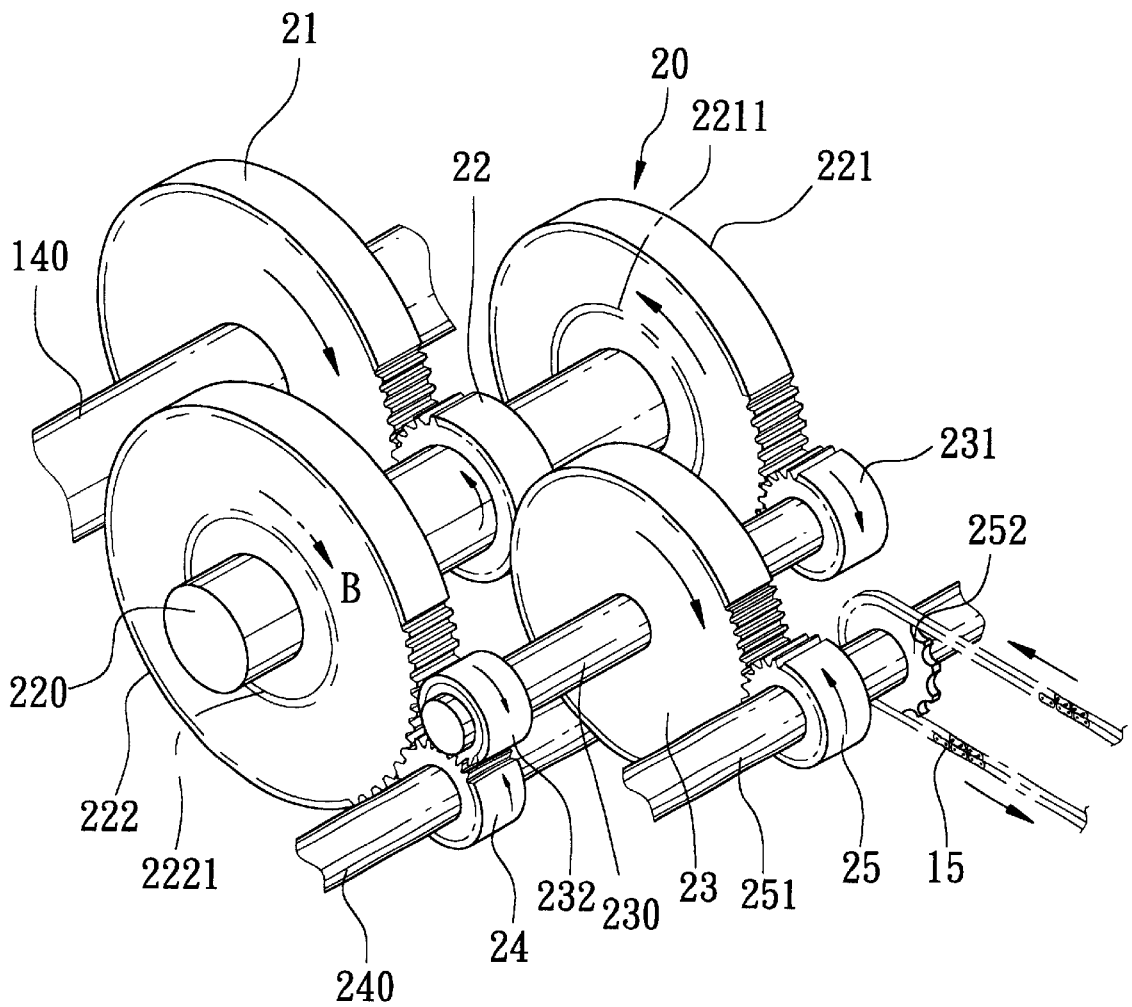
FIG. 6 is a schematic view, illustrating the rotational directions of the gears and shafts of the driving device when a rear end of the pedal is pressed.

The first one-way mechanism 2211 (see FIG. 5) is disposed between the first driving side gear 221 and the second shaft 220 so as to permit synchronous rotation of the first driving side gear 221 and the second shaft 220 only when a rear end of the pedal 14 is pressed to rotate the first shaft 140 in a clockwise direction, which is indicated by the arrowhead (B) in FIG. 6. In this embodiment, the first one-way mechanism 2211 is constructed as a ratchet unit. When the second shaft 220 rotates clockwise, the first one-way mechanism 2211 (see FIG. 5) disconnects the first driving side gear 221 from the second shaft 220, as shown in FIG. 5.

The second one-way mechanism 2221 is disposed between the second driving side gear 222 and the second shaft 220 so as to permit synchronous rotation of the second driving side gear 222 and the second shaft 220 only when a front end of the pedal 14 is pressed to rotate the first shaft 140 in a counterclockwise direction, which is indicated by the arrowhead (A) in FIG. 5. In this embodiment, the second one-way mechanism 2221 is also constructed as a ratchet unit. When the second shaft 220 rotates counterclockwise, the second one-way mechanism 2221 (see FIG. 5) disconnects the second driving side gear 222 from the second shaft 220, as shown in FIG. 6.

The first driven side gear 231 is sleeved fixedly on the third shaft 230, and meshes with the first driving side gear 221 so as to rotate the third shaft 230 clockwise only when the rear end of the pedal 14 is pressed, as shown in FIG. 6.

The third driven side gear 24 is sleeved fixedly on the fourth shaft 240, and meshes with the side gear 222 so as to rotate the fourth shaft 240 counterclockwise only when the front end of the pedal 14 is pressed, as shown in FIG. 5.

The second driven side gear 232 is sleeved fixedly on the third shaft 230, and meshes with the third driven side gear 24 so as to rotate the third shaft 230 clockwise only when the front end of the pedal 14 is pressed, as shown in FIG. 5.

The driving middle gear 23 is sleeved fixedly on the third shaft 230. The driven gear 25 and the driving wheel 252 are sleeved fixedly on the fifth shaft 251. The driven gear 25 meshes with the driving middle gear 23 so as to rotate the fifth shaft 251 counterclockwise when either of the front and rear ends of the pedal 14 is pressed, thereby turning the rear wheel 23 forward during swinging movement of the pedal 14. As such, when the pedal 14 swings, the fifth shaft 251 rotates counterclockwise continuously.

In this embodiment, the driven middle gear 22 has a diameter, which is smaller than those of the driving gear 21 and the first and second driving side gears 221, 222. In addition, each of the driving middle gear 23 and the first and second driving side gears 221, 222 has a diameter, which is larger than those of the first, second, and third driven side gears 231, 232, 24 and the driven gear 25.

Accordingly, the scooter of this invention can be propelled to move forward continuously, and has a high safety.

With this invention thus explained, it is apparent that numerous modifications and variations can be made without departing from the scope and spirit of this invention. It is therefore intended that this invention be limited only as indicated by the appended claims.

I claim:
1. A propelling scooter comprising:
an elongated chassis having a front end and a rear end;
an upright head tube having a lower end portion that is attached to said front end of said chassis, and an upper end portion that is formed with a handle;
a front wheel attached steerably to said front end of said chassis;
a rear wheel attached rotatably to said rear end of said chassis;
an elongated pedal disposed swingably on said chassis between said front and rear wheels and having a front end and a rear end;
a horizontal transverse first shaft journalled on said chassis and connected fixedly to said pedal, thereby permitting rotation of said pedal about said first shaft;
a flexible endless drive piece;
a driven wheel connected coaxially and fixedly to said rear wheel; and
a driving device including:
    a driving gear sleeved fixedly on said first shaft so as to rotate reciprocally about said first shaft when said pedal swings relative to said chassis,
    a driving wheel mounted rotatably on said chassis between said first shaft and said rear wheel, said endless drive piece extending around said driving and driven wheels for transferring rotation of said driving wheel to said driven wheel,
    a driven gear connected coaxially and fixedly to said driving wheel, and
    a transmission gearing unit interconnecting said driving and driven gears for converting reciprocal rotation of said first shaft into continuous unidirectional rotation of said driving wheel,
said transmission gearing unit includes:
    a second shaft journalled on said chassis between said first shaft and said driven gear;
    a driven middle gear sleeved fixedly on a middle portion of said second shaft and meshing with said driving gear so that said first and second shafts rotate in opposite directions;
    a pair of first and second driving side gears sleeved respectively and rotatably on two ends of said second shaft;
    a first one-way mechanism disposed between said first driving side gear and said second shaft so as to permit synchronous rotation of said first driving side gear and said second shaft only when said rear end of said pedal is pressed;
    a second one-way mechanism disposed between said second driving side gear and said second shaft so as to permit synchronous rotation of said second driving side gear and said second shaft only when said front end of said pedal is pressed;
    a third shaft journalled on said chassis between said second shaft and said driven gear;
    a first driven side gear sleeved fixedly on said third shaft and meshing with said first driving side gear so as to rotate said third shaft in a first direction only when said rear end of said pedal is pressed;
    a fourth shaft journalled on said chassis behind said second shaft;
    a second driven side gear sleeved fixedly on said fourth shaft and meshing with said second driving side gear so as to rotate said fourth shaft in a second direction, which is opposite to said first direction, only when said front end of said pedal is pressed;

a third driven side gear sleeved fixedly on said third shaft and meshing with said second driven side gear so as to rotate said third shaft in said first direction only when said front end of said pedal is pressed;

a driving middle gear sleeved fixedly on said third shaft;

a fifth shaft journalled on said chassis behind said third shaft, both of said driven gear and said driving wheel being sleeved fixedly on said fifth shaft, said driven gear meshing with said driving middle gear so as to rotate said fifth shaft in said second direction when either of said front and rear ends of said pedal is pressed, thereby turning said rear wheel forward during swinging movement of said pedal.

2. The propelling scooter as claimed in claim 1, wherein said driven middle gear has a diameter, which is smaller than those of said driving gear and said first and second driving side gears, each of said driving middle gear and said first and second driving side gears having a diameter, which is larger than those of said first, second, and third driven side gears and said driven gear.

3. The propelling scooter as claimed in claim 1 wherein said driving device further includes a rectangular casing, which is bolted to said chassis and which receives said transmission gearing unit therein.

4. The propelling scooter as claimed in claim 1, wherein said pedal includes:

a top surface having a front half portion and a rear half portion; and two curved and inclined parallel retaining straps disposed respectively on said front and rear half portions of said top surface, each of said straps having two ends that are fastened to said top surface so as to define a foot-receiving space between said top surface and each of said straps, which is adapted to confine a foot of a user therewithin.

5. The propelling scooter as claimed in claim 1, wherein said driving and driven wheels are constructed as sprockets, said drive piece being constructed as a chain.

* * * * *